| 
US010848630B2

(12) United States Patent
Ito

(10) Patent No.: US 10,848,630 B2
(45) Date of Patent: Nov. 24, 2020

(54) INFORMATION PROCESSING APPARATUS THAT SELECTS A THRESHOLD FOR DETERMINING A TOUCH INPUT OPERATION BASED ON A DISPLAY SIZE OF CONTENT AND NON-TRANSITORY COMPUTER-READABLE STORAGE

(71) Applicant: CANON KABUSHIKI KAISHA, Tokyo (JP)

(72) Inventor: Mario Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/684,967

(22) Filed: Aug. 24, 2017

(65) Prior Publication Data

US 2018/0077306 A1 Mar. 15, 2018

(30) Foreign Application Priority Data

Sep. 14, 2016 (JP) .................................. 2016-179983

(51) Int. Cl.
*H04N 1/00* (2006.01)
(52) U.S. Cl.
CPC ..... *H04N 1/00506* (2013.01); *H04N 1/00392* (2013.01); *H04N 1/00411* (2013.01); *H04N 1/00464* (2013.01); *H04N 1/00469* (2013.01); *H04N 2201/0094* (2013.01)
(58) Field of Classification Search
CPC ........... H04N 1/00506; H04N 1/00392; H04N 1/00411; H04N 1/00464; H04N 1/00469; H04N 2201/0094
See application file for complete search history.

(56) References Cited

U.S. PATENT DOCUMENTS

| 8,621,364 | B2 | 12/2013 | Ito | |
|---|---|---|---|---|
| 2013/0229370 | A1* | 9/2013 | Shimizu | G06F 3/048 345/173 |
| 2014/0372865 | A1* | 12/2014 | Corob | G06F 40/166 715/234 |
| 2015/0128037 | A1* | 5/2015 | Lee | G06F 9/454 715/703 |
| 2016/0179292 | A1* | 6/2016 | Fujimoto | G06F 3/0416 345/175 |
| 2017/0048409 | A1* | 2/2017 | Kichikawa | H04N 1/00204 |

FOREIGN PATENT DOCUMENTS

| JP | 2010-136329 A | 6/2010 |
|---|---|---|
| JP | 2013-191175 A | 9/2013 |
| JP | 2014-186581 A | 10/2014 |

OTHER PUBLICATIONS

Japanese Office Action issued in corresponding Japanese Application No. 2016-179983, dated Jul. 6, 2020.

* cited by examiner

*Primary Examiner* — Sahlu Okebato
(74) *Attorney, Agent, or Firm* — Venable LLP

(57) ABSTRACT

An information processing apparatus comprises a touch input unit by which touch input is possible and a Web browser function for displaying Web content on a display unit, wherein the Web browser function comprises: an analyzing unit configured to analyze Web content displayed on the display unit, and a setting unit configured to, in accordance with content of the Web content analyzed by the analyzing unit, set a value to be used when a type of a touch input operation inputted at the touch input unit is determined.

10 Claims, 14 Drawing Sheets

FIG. 6A

| ITEM | VALUE | |
|---|---|---|
| | | ~600 |
| THRESHOLD 1 | 25px | ~601 |
| THRESHOLD 2 | 50px | ~602 |

FIG. 6B

| ITEM | CLICK LOWER LIMIT | CLICK UPPER LIMIT | DRAG LOWER LIMIT | DRAG UPPER LIMIT | |
|---|---|---|---|---|---|
| | | | | | ~610 |
| THRESHOLD 1 | 0 | 20 | 40 | 100 | |
| THRESHOLD 2 | 0 | 40 | 60 | 120 | |

FIG. 6C

| ITEM | VALUE | |
|---|---|---|
| | | ~620 |
| INPUT FORM THRESHOLD | 10 | |

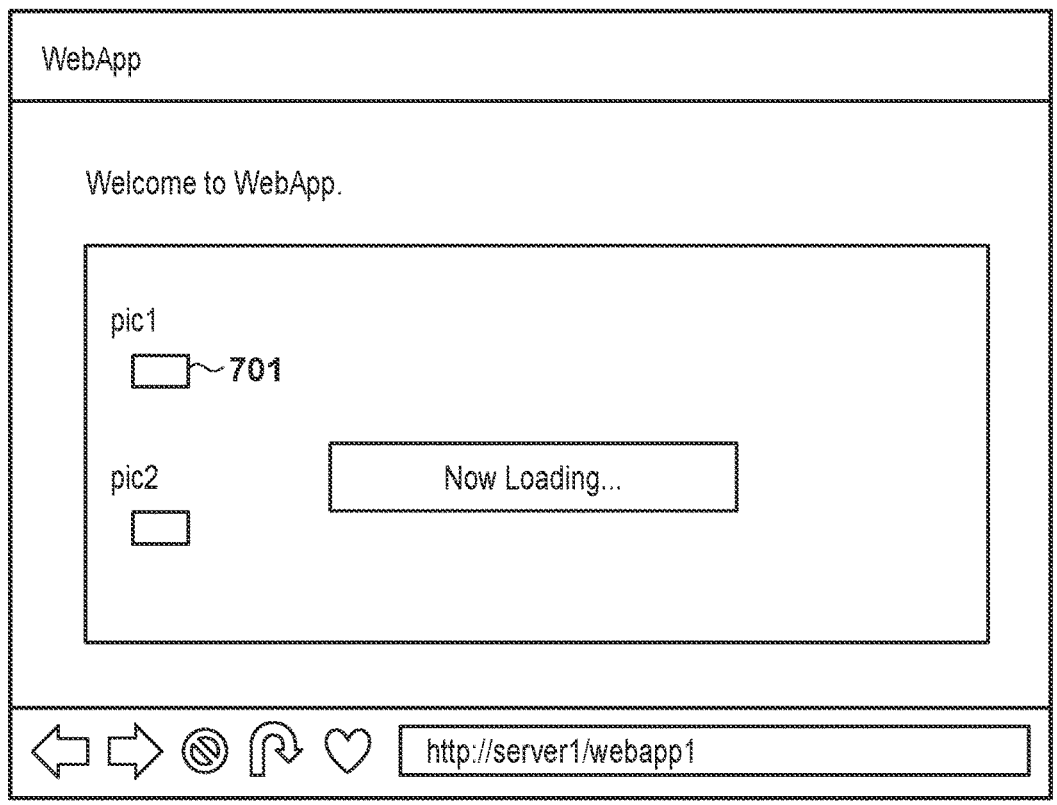

```
801
window.onmousemove= showInfo;         802
function showInfo(event) {
    document.body.innerHTML= event.clientX+ ", " + event.clientY;
}
```

FIG. 14

```
<html>
  <head>
    <title>WebApp</title>
  </head>
  <body>
    welcome to WebApp.
    <form>
      <input type="text">          ⌒1401
      <input type="password">      ⌒1402
    </form>
  </body>
</html>
```

FIG. 15

```
<html>
  <head>                                                    1501
    <title>WebApp</title>
    <link rel="stylesheet" type="text/css" href="theme.css">
    <script src="./logic.js">/script>  ⌒1502
  </head>
  <body>
    welcome to WebApp.
    <imgsrc="./applogo.png">  ⌒1503
    <iframesrc="insert.html"></iframe>  ⌒1504
  </body>
</html>
```

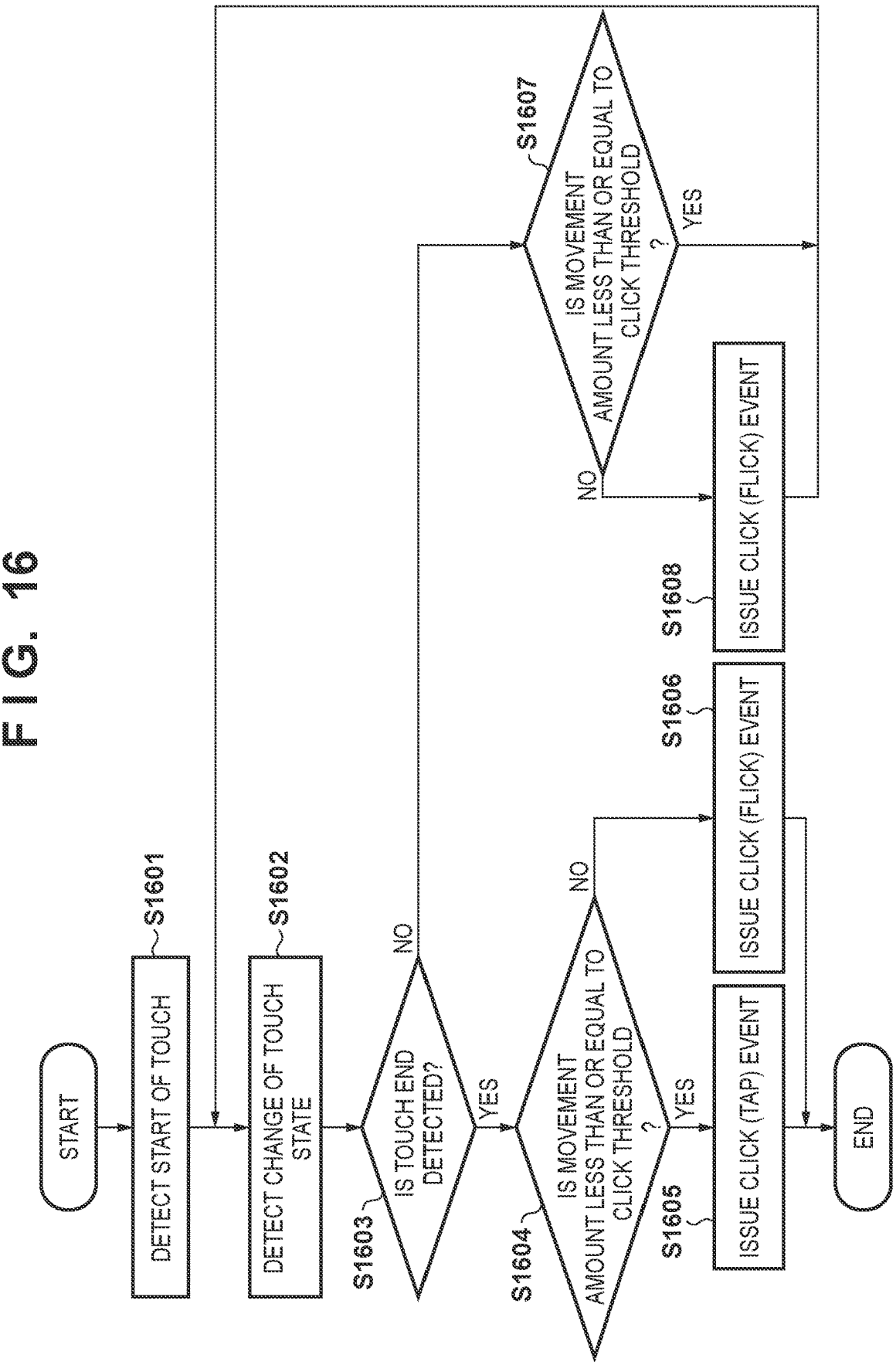

INFORMATION PROCESSING APPARATUS THAT SELECTS A THRESHOLD FOR DETERMINING A TOUCH INPUT OPERATION BASED ON A DISPLAY SIZE OF CONTENT AND NON-TRANSITORY COMPUTER-READABLE STORAGE

BACKGROUND OF THE INVENTION

Field of the Invention

The present invention relates to an information processing apparatus, a method of controlling the same, and a non-transitory computer-readable storage medium.

Description of the Related Art

In recent years, there are image processing apparatuses called MFPs (Multi Function Peripherals) that have scanner and printer functions and that comprise a Web browser for displaying Web content. Many MFPs that comprise a Web browser also comprise a touch screen, and a user by touch input can perform a drag operation in addition to a touch or a click. For example, in Japanese Patent Laid-Open No. 2010-136329, in accordance with the distance of movement on a screen in a touch state, determination as to whether the touch is a tap or something else (a drag, a move, or a flick) is performed.

By determining a click (tap) if the movement distance from when an instruction member such as a finger contacts the screen to when it separates from the screen is within a fixed amount (threshold), and determining a drag if the movement distance is greater than or equal to the fixed amount, as in Japanese Patent Laid-Open No. 2010-136329, it becomes possible to accept each operation. However, there are cases in which though the user intended a click, their finger contacting the screen shakes, and the center point of the finger changes due to change in the contact area, and thereby the movement distance of the finger changes and a misdetection as a drag occurs. In contrast, if the threshold for determining a click is made to be large, for example, drags become more difficult. In this way, there is a problem in that it is difficult to set a threshold for determining a touch operation that is suited to various situations, and user operability is impaired.

SUMMARY OF THE INVENTION

Accordingly, the present application invention improves user operability by setting a threshold for determining a touch operation in accordance with the displayed Web content.

According to one aspect of the present invention, there is provided an information processing apparatus comprising a touch input unit by which touch input is possible and a Web browser function for displaying Web content on a display unit, wherein the Web browser function comprises: an analyzing unit configured to analyze Web content displayed on the display unit, and a setting unit configured to, in accordance with content of the Web content analyzed by the analyzing unit, set a value to be used when a type of a touch input operation inputted at the touch input unit is determined.

According to another aspect of the present invention, there is provided a method of controlling an information processing apparatus comprising a touch input unit by which touch input is possible and a Web browser function for displaying Web content on a display unit, the method comprising: in the Web browser function, analyzing Web content displayed on the display unit, and in accordance with the analyzed content of the Web content, setting a value to be used when a type of a touch input operation inputted at the touch input unit is determined.

According to another aspect of the present invention, there is provided a non-transitory computer-readable storage medium storing a program for causing a computer comprising a touch input unit by which touch input is possible and a display unit to function as, in a Web browser function, an analyzing unit configured to analyze Web content displayed on the display unit, and a setting unit configured to, in accordance with content of the Web content analyzed by the analyzing unit, set a value to be used when a type of touch input operation inputted at the touch input unit is determined.

According to another aspect of the present invention, there is provided an information processing apparatus, comprising: a display unit configured to display content; a touch input unit by which touch input is possible; a determination unit configured to determine which touch input out of a plurality of touch input operations a touch input operation inputted by the touch input unit is; and a setting unit configured to, in accordance with a display size of content displayed on the display unit, set a value to be used when a type of a touch input operation is determined by the determination unit.

By the present application invention, by setting a threshold for determining the type of a touch operation in accordance with the content of Web content displayed on a Web browser, it is possible to improve user operability on a touch panel in relation to the Web content.

Further features of the present invention will become apparent from the following description of exemplary embodiments (with reference to the attached drawings).

BRIEF DESCRIPTION OF THE DRAWINGS

FIGS. 6A, 6B, and 6C are views for describing examples of respective table configurations according to the present invention.

FIGS. 7A and 7B are views illustrating examples of display screens of a Web browser according to the present invention.

FIG. 14 is a view for describing of an example of an HTML description of the Web content.

FIG. 15 is a view illustrating an example of sub-resources in an HTML description.

FIG. 16 is a flowchart for describing processing for determining a touch operation according to the present invention.

DESCRIPTION OF THE EMBODIMENTS

Below, explanation of embodiments for implementing the present invention will be given using drawings.

First Embodiment

Figure 1:
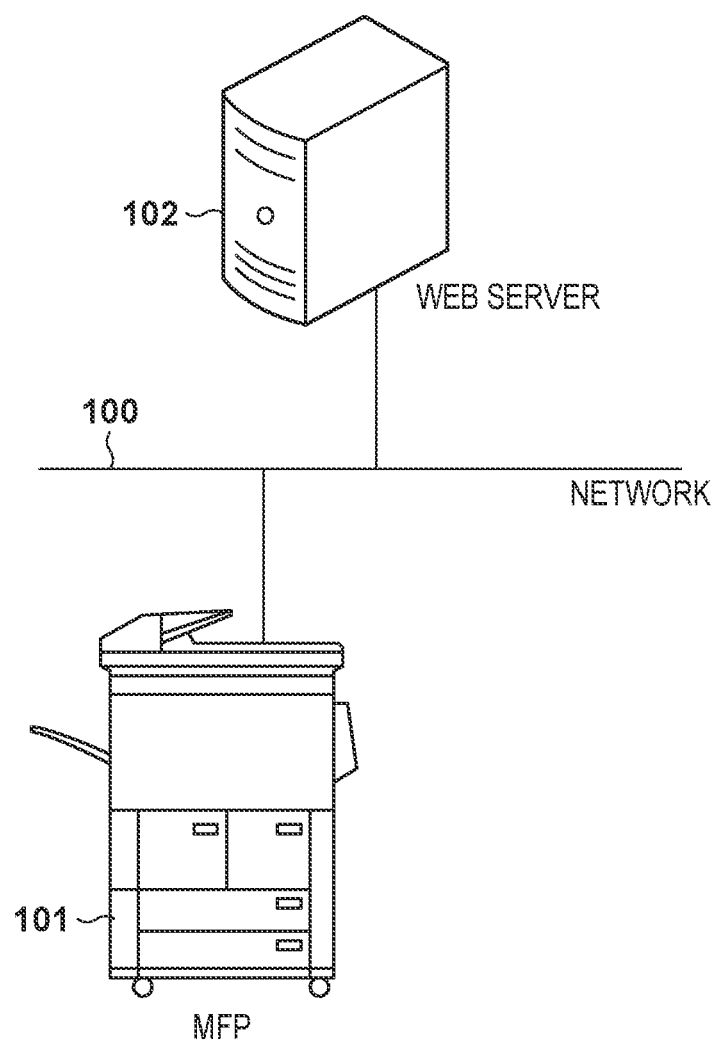
FIG. 1 is a view illustrating an example of an overall configuration of a system according to the present invention.

FIG. 1 is a view illustrating an example of a configuration of a system including an image processing apparatus according to the present invention. An explanation using an MFP 101 as an image processing apparatus as an example will be given here, but another apparatus may be applied if it is a network device or an information processing apparatus which includes a user interface (a Web browser function) of a form in which a touch panel displays Web content.

The system is configured to include the MFP 101, which is an image processing apparatus, and a Web server 102, and these are connected communicably via a network 100. Note, in FIG. 1, only one device is illustrated for each of the MFP 101 and the Web server 102, but there is no limitation to this, and more image processing apparatuses and Web servers that provide different Web content may be included, and other apparatuses may be included. The network 100 is a base for performing communication between the apparatuses, and may be a local network or connected to the Internet.

The Web server 102 includes a function for distributing Web content via the network 100 and provides Web content in accordance with a request from the MFP 101. Note, the Web server 102 may be configured as a function of the MFP, and in this case, a plurality of MFPs are connected via the network, and respectively form server-client relationships.

Figure 2:
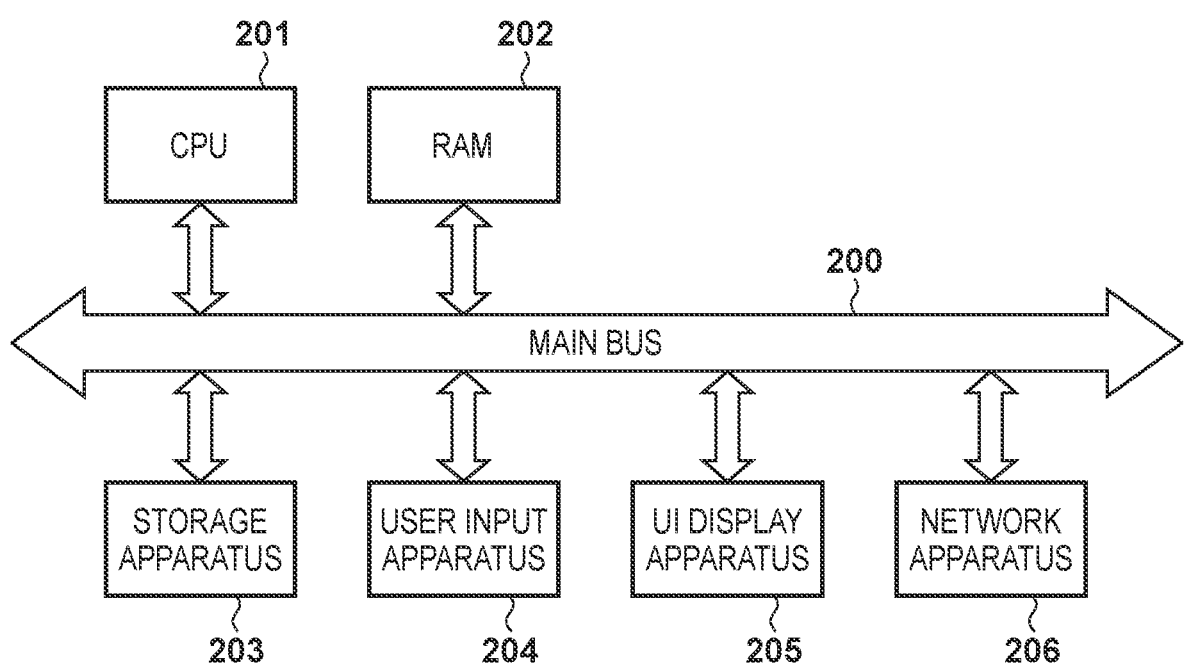
FIG. 2 is a view illustrating an example of a hardware configuration of an MFP according to the present invention.

FIG. 2 is a view illustrating an example of a hardware configuration of the MFP 101 according to the present embodiment. The MFP 101 comprises a CPU 201 that controls the apparatus as a whole, a RAM 202 that provides a work area for the CPU 201, and a storage apparatus 203 (may be an HDD, NVRAM, or the like) that stores programs and various settings. Furthermore, the MFP 101 comprises a user input apparatus 204 by which a user performs input of various instructions, a UI display apparatus 205 that performs screen display, and a network apparatus 206 that performs communication via a network 100 with other apparatuses. In the present embodiment, the user input apparatus 204 includes a touch panel, and it is possible to perform a touch operation by an instruction member such as a finger and the like. Each part that the MFP 101 includes is connected communicably by a main bus 200. Note, the UI display apparatus 205 may be configured integrally and serve as the user input apparatus 204 such as with a touch panel display. Also, in the MFP 101, in addition to the configurations illustrated in FIG. 2, an image reading apparatus and a printing apparatus are connected to the main bus 200. Also, the Web server 102 according to the present application invention can be realized in an apparatus having a configuration of a generic information processing apparatus such as a PC. In the case where the function of the Web server is realized as a function of an MFP, as described above, it may be realized by the configuration illustrated in FIG. 2.

Figure 3:
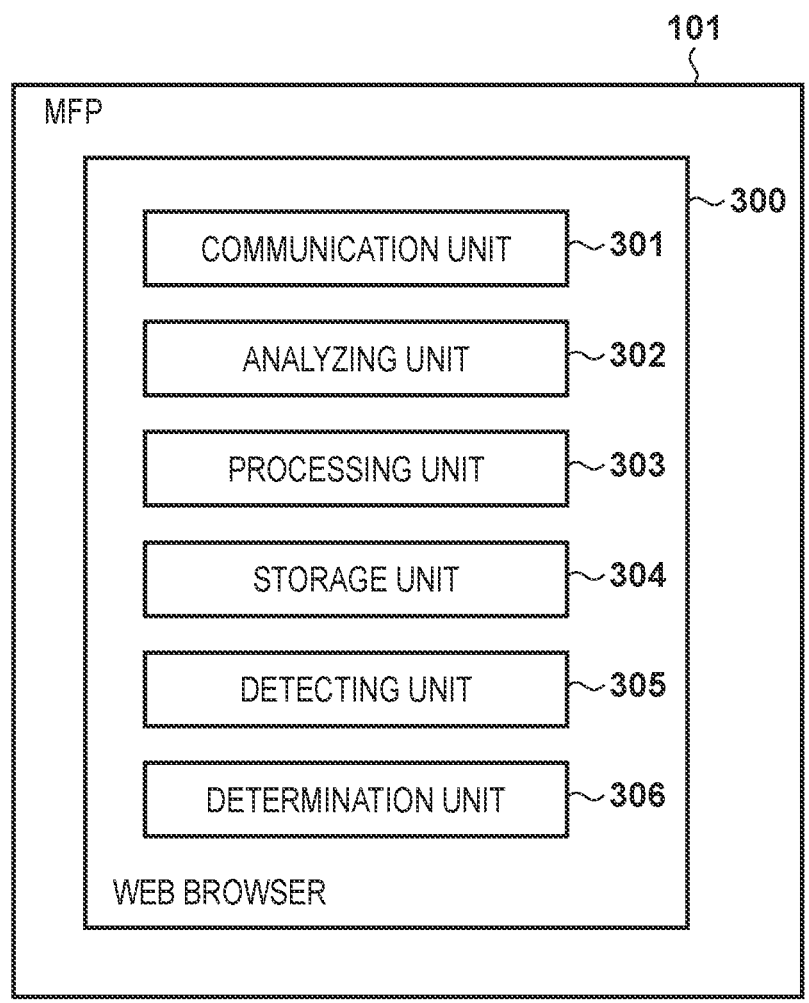
FIG. 3 is a view illustrating an example of a software configuration of the MFP according to the present invention.

FIG. 3 is a view illustrating an example of a software configuration of the MFP 101 according to the present embodiment. Each functional unit illustrated in FIG. 3 is realized by the CPU 201 of the MFP 101 reading a control program stored in the storage apparatus 203 or the like and executing it.

The MFP 101 has a Web browser 300 which is a kind of a Web application. The Web browser 300 has a function of obtaining Web content by performing communication with a particular server (the Web server 102 here), and displaying that Web content on a screen. The Web browser 300 has a communication unit 301, an analyzing unit 302, a processing unit 303, a storage unit 304, a detecting unit 305 and a determination unit 306.

The communication unit 301 communicates with the Web server 102 in accordance with HTTP (Hypertext Transfer Protocol) and other communication protocols. More specifically, when the communication unit 301 is instructed to obtain Web content, the communication unit 301 sends a request for the Web content to the Web server 102, and receives a response thereto.

The analyzing unit 302 analyzes a response received from the Web server 102. A response may include HTML (Hypertext Markup Language) data which is a description indicating operation screen content to be displayed on the Web browser 300, and data such as JavaScript (registered trademark) that is to be applied to the operation screen. Below, together these are referred to "Web content". Note, when a communication error or the like is received as a response, the Web browser 300 displays something to that effect.

The processing unit 303 displays the Web content on the UI display apparatus 205 based on a result of analysis by the analyzing unit 302. In a case where the Web content includes JavaScript data (registered trademark), that JavaScript (registered trademark) data is executed. When based on the result of analysis by the analyzing unit 302, Web content is displayed on the UI display apparatus 205, and the processing unit 303 stores a display width and a display height of the Web content that is displayed temporarily in memory. The display width and display height of the Web content displayed here are not the size that is actually displayed on the UI display apparatus 205, but rather the width and height of the Web content as a whole. The display width and the display height stored temporarily are overwritten when other Web content is displayed. When the display of Web content completes, a comparison of the display width and the display height of the Web content with the Web content display range (display size) in the screen of the Web browser 300 is performed. Then, in accordance with the comparison result, a threshold (hereinafter referred to as "click threshold") that is suitable to operation on the touch panel is decided. Details of the threshold and of decision thereof are explained later in conjunction with flowcharts.

The display size of the Web browser 300 illustrates an area for displaying Web content out of the areas that configure the display screen of the Web browser 300, and this is saved in the storage unit 304, and read out by the processing unit 303. Note, in the present embodiment, the threshold to be applied is determined by referencing both the display width and the display height, but configuration may be taken to determine the threshold to be applied by referencing only the value of one of the display width or the display height. Also, configuration may be taken so that the display size of the Web browser 300 can be changed in accordance with the screen size of the UI display apparatus 205 or a user setting. For example, regarding an address bar for displaying a URL of Web content that the Web browser 300 comprises, configuration may be taken to, in a case where the address bar was set to be hidden based on a user instruction, increase the size of the display area of the Web content by that size.

Various tables illustrated on FIG. 6A to FIG. 6C are stored in the storage unit 304, and values thereof are read out in accordance with processing. Configuration of the tables is explained later. Display size information (not shown) of the Web browser 300 is stored in the storage unit 304.

The detecting unit 305 detects a distance that a touch (a contact) moves between the start and the end (a release of the contact) in a touch operation inputted via the user input apparatus 204.

The determination unit 306 obtains the movement distance of a touch operation detected by the detecting unit 305 and performs determination of whether the operation is a click operation or a drag operation when a touch operation is performed on the user input apparatus 204. In such a case, the determination is performed in accordance with whether or not the movement distance exceeds the click threshold mentioned above.

Example of Web Content

Examples of Web content according to the present embodiment will be discussed. FIG. 14 and FIG. 15 illustrate examples of a description of Web content which is used in the present embodiment.

Web content is defined as a description language such as HTML as FIG. 14 and FIG. 15 illustrate. Parts which are described in a scripting language such as JavaScript (registered trademark) may be included therein. Images which are referenced by img elements included in HTML tags or the like and HTML content which is referenced by frame elements are described in Web content. These referenced resources are referred to as "sub-resources" below.

FIG. 15 is an example of a description of Web content which refers to sub-resources, and HTML tags are described therein. The Web content illustrated on FIG. 15 includes a link element 1501, an img element 1503, a script element 1502, and an iframe element 1504. These elements describe locations (storage destinations) of resource that are referenced by an href attribute or a src attribute, and indicate that it is necessary to obtain these resources. In this way, resources referenced from the Web content are sub-resources.

[Operation Sequence]

Figure 4:
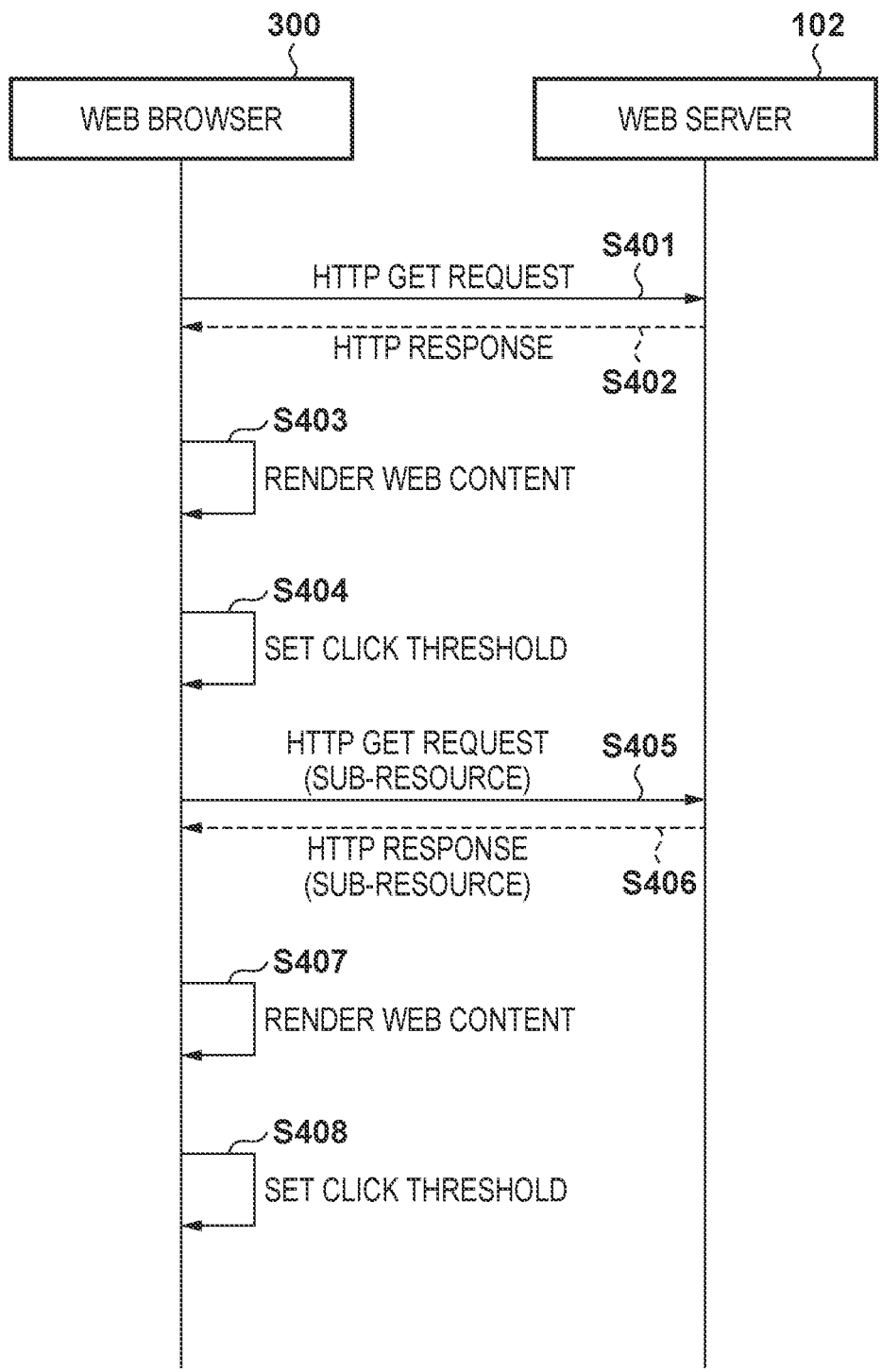
FIG. 4 is a view for describing a threshold setting sequence according to the present invention.

FIG. 4 is a view for describing sequence for deciding a click threshold when the Web browser 300 obtain Web content from the Web server 102. Each process is realized by the CPUs of the MFP 101 that comprises the Web browser 300 and the Web server 102 executing predetermined programs. Note, processing in a case where a communication error occurs or the like is omitted.

In step S401, the communication unit 301 of the Web browser 300, when activated in accordance with a request by a user or the like, sends an HTTP request to the Web server 102 which provides desired Web content.

In step S402, the communication unit 301 in the Web browser 300 receives the Web content as an HTTP response from the Web server 102.

The analyzing unit 302 in the Web browser 300, in step S403, analyzes the received Web content. The processing unit 303 displays the Web content on the UI display apparatus 205 based on a result of analysis. An example of a display result is illustrated on FIG. 7A. Note, details about the display are explained later.

In step S404, the processing unit 303 in the Web browser 300 obtains the display width and the display height of the Web content based on the result which the analyzing unit 302 has analyzed in step S403. Furthermore, the processing unit 303 reads out a threshold from threshold table 600 illustrated in FIG. 6A, in accordance with the obtained display width and display height, and sets a click threshold thereto.

In step S405, the communication unit 301 in the Web browser 300 sends an HTTP request for obtaining a sub-resource (an image or the like) of Web content received in step S402 to the Web server 102 via the communication unit 301.

In step S406, the communication unit 301 in the Web browser 300 receives the sub-resource that the Web content received in step S402 references as an HTTP response from the Web server 102.

In step S407, the processing unit 303 in the Web browser 300 displays, on the UI display apparatus 205, the sub-resource which is received in step S406 together with Web content which is received in step S402. An example of a display result is illustrated on FIG. 7B. Details of an example of display are described later.

In step S408, the processing unit 303 in the Web browser 300 again obtains the display width and the display height of Web content from the result of reflecting the sub-resource in the display in step S407. The processing unit 303 performs a determination based on the size of a display as with step S404, and sets a click threshold.

The above sequence is explained with the example of a case where the Web browser 300 activates, but limitation is not made to this, and configuration may be taken such that the sequence is performed when new Web content is displayed (transition to other Web content).

[Threshold Setting Processing for Determining]

Figure 5:
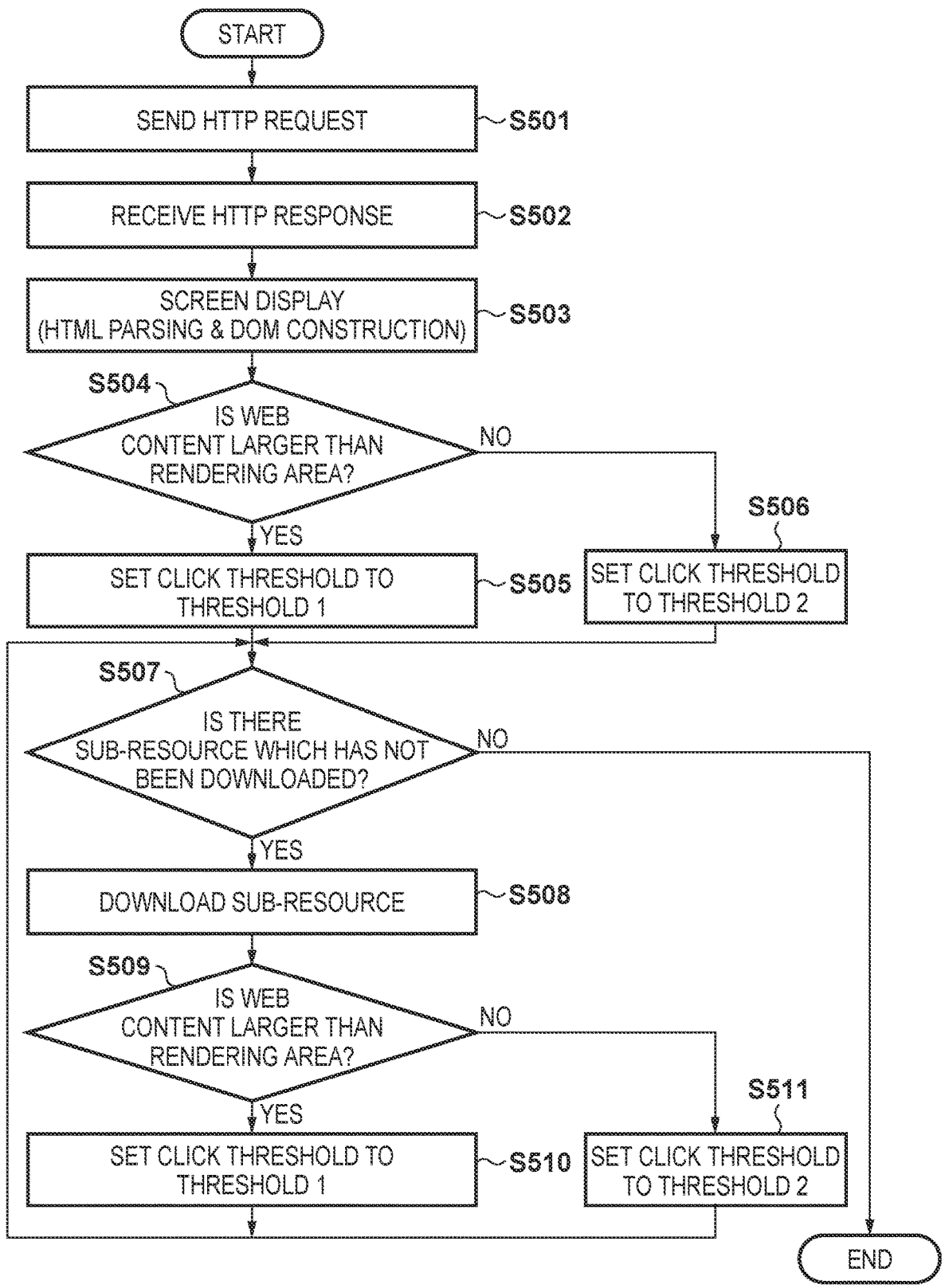
FIG. 5 is a flowchart for describing processing for determining a threshold setting according to the present invention.

FIG. 5 is a flowchart illustrating processing in the Web browser 300 for determining a threshold setting. Each step of this processing flow corresponds to processing of the Web browser 300 illustrated in FIG. 4 and describes details thereof. This processing flow is realized by the CPU 201 of the MFP 101 reading a program according to the Web browser 300 and executing it.

In step S501, the communication unit 301 of the Web browser 300 sends an HTTP request to the Web server 102 that provides desired Web content.

In step S502, the communication unit 301 in the Web browser 300 receives the Web content as an HTTP response from the Web server 102.

In step S503, the analyzing unit 302 in the Web browser 300 analyzes the received Web content, and displays the result on the UI display apparatus 205. The analysis processing here corresponds to analysis of HTML tags of the Web content and construction of a DOM (Document Object Model), for example. An example of a display result is a screen illustrated on FIG. 7A. In a case where there is a designation of a sub-resource such as with the Web content illustrated in FIG. 7A, display thereof is not performed because at that point in time, the sub-resource has not been obtained.

In step S504, the processing unit 303 in the Web browser 300 obtains the display width and the display height of the Web content as a whole from the result which the analyzing unit 302 has analyzed in step S503. As described above, the display width and the display height exclude the size of the sub-resource in a case where there is a designation of a sub-resource in the Web content. Also, the processing unit 303 determines whether or not the display width and the display height of the Web content are larger than the display area of the Web browser 300. In a case where they are larger than the display area (YES in step S504), the processing transitions to step S505, and in a case where they are smaller than the display area (NO in step S504), the processing transitions to step S506.

In step S505, the processing unit 303 in the Web browser 300 read outs a value of a threshold 1 from the threshold table 600 illustrated in FIG. 6A and sets a click threshold thereto. Note, the threshold 1 is the click threshold which is suitable for the drag operation (for example, an operation to perform scrolling of the screen).

In step S506, the processing unit 303 in the Web browser 300 reads out a value of a threshold 2 from the threshold table 600 and sets a click threshold thereto. Note, the threshold 2 is the click threshold which is suitable for the click operation (for example, an operation to perform a button click).

In step S507, the processing unit 303 of the Web browser 300 determines whether or not there is a sub-resource whose download has not yet completed. This processing flow ends in the case where there are no sub-resource references in the Web content received in step S502 and in the case where the downloading of all of the sub-resources has completed (NO in step S507). On the other hand, in the case a sub-resource whose download is not yet completed is present (YES in step S507), the processing proceeds to step S508.

In step S508, the communication unit 301 of the Web browser 300 downloads a sub-resource that has yet to be downloaded. This corresponds to step S405 to step S406 in FIG. 4.

In step S509, the processing unit 303 in the Web browser 300 reflects the sub-resource obtained in step S508 in the display of the Web content, and obtains the display width and the display height of Web content again after reflection. Also, the processing unit 303 determines whether or not the display width and the display height of the Web content are larger than the size of the display area of the Web browser 300 read from the storage unit 304. In the case where the display width and the display height of the Web content are greater than the size of the display area of the Web browser 300 (YES in step S509), the processing transitions to step S510, and in the case where they are smaller (NO in step S509), the processing transitions to step S511. Note, in a case where, after the determination of step S504, a setting change (for example, switching the address bar between hidden/displayed) is performed in relation to the Web browser 300 as described above, and the size of the display area changes, the size of the display area after the change and the size of the Web content is compared. Accordingly, in such a case, the size of the display area of the Web browser 300 used in step S504 and the size of the display area of the Web browser 300 used in step S507 become different. In other words, the size of the display area for displaying Web content of the Web browser 300 is updated in the storage unit 304 at the time of the change.

In step S510, the processing unit 303 in the Web browser 300 reads out the value of the threshold 1 from the threshold table 600 and sets the click threshold thereto. Then, the processing proceeds to step S507.

In step S511, the processing unit 303 in the Web browser 300 reads out a value of a threshold 2 from the threshold table 600 and sets a click threshold thereto. Then, the processing proceeds to step S507.

[Table Configuration]

FIG. 6A is a view illustrating an example of a configuration of the threshold table 600 stored in the storage unit 304 in the Web browser 300. In the threshold table 600, a threshold 601 which is suitable for a drag operation (for example, an operation for performing a screen scroll) is stored as the threshold 1, and a threshold 602 which is suitable for a click (for example, an operation for performing a button click) is stored as the threshold 2. Specifically, detection of dragging is made easier than detection of clicking (tapping) by making the value smaller with the threshold 1. On the other hand, detection of clicking (tapping) is made easier by making the value larger with the threshold 2.

Determination of clicking and dragging may be designated by section thresholds. An example of such a case is illustrated in FIG. 6B. FIG. 6B includes section thresholds 610. In the section thresholds 610, thresholds for clicking and dragging are respectively stored as sections represented by an upper limit and a lower limit. For example, in the example of FIG. 6B, in the case where the threshold 1 is set, and the distance from the contact start position to the contact end position of an instruction member such as a finger in relation to the touch panel is 10, that operation is determined to be a click. Also, there may be a section in which a click is determined, a section in which a drag is determined, and a section in which neither are determined therebetween. For example, in the example of FIG. 6B, in the case where the threshold 1 is set, and the distance from the contact start position to the contact end position of an instruction member such as a finger in relation to the touch panel is 30, that operation is not determined to be a click or a drag.

FIG. 6C is a view illustrating an input form threshold 620 stored in the storage unit 304 in the Web browser 300. The input form threshold 620 is a threshold used in a case where a click threshold is determined in accordance with the number of input forms included in the Web content, and the input form threshold 620 is read into the processing unit 303. A purpose of the input form threshold 620 is explained in conjunction with a flowchart on FIG. 12.

Note, each threshold indicated in FIG. 6A to FIG. 6C is an example and limitation is not made to the above. For example, the values in FIG. 6A and FIG. 6B may be decided in accordance with sensitivity and capability of the touch panel. Also, configuration may be taken such that the threshold of FIG. 6C can be selected in accordance with the size of the display (the UI display apparatus 205) and the size of the display area of the Web content in the Web browser 300.

Also, the threshold table 600 need not be stored in the storage unit 304 in the MFP 101, and may be described in a JavaScript (registered trademark) program included in the Web content.

Screen Configuration Example

FIG. 7A is a view illustrating a state in which Web content including a reference to a sub-resource (an image or the like) is included in the Web browser 300 is displayed in step S403 of FIG. 4. In step S403, analysis of the Web content is completed, but reading of unread sub-resources such as an image 701 has not been completed. An example in which the display height of the Web content is restrained to the display size of the Web browser 300 in this state is illustrated.

FIG. 7B is a view illustrating a state in which Web content including an image which is a sub-resource in the Web browser 300 is displayed in step S407 of FIG. 4. In step S407, reading of the unread image 701 completes, and the processing changes to display of the image 711 which is in a state in which reading has completed. By this, an example in which, to handle the display height of the Web content as a whole changing, and ceasing to fit into the display size of the Web browser 300, a scroll bar 712 is displayed, is illustrated.

In the present embodiment, by the above described processing, a threshold that is suited to dragging is selected in accordance with the Web content ceasing to fit into the size of the display area of the Web browser 300. As a result, misdetection of a touch operation is reduced and a drag operation becomes easier for a user.

In other words, in a case where the Web content to be displayed does not fit into the size of the display area of the Web browser 300, it is envisioned that the possibility that a scroll operation or the like will be used, for example, is high and so a threshold that makes detection of a drag operation which is related to that operation easier is set. On the other hand, in a case where the Web content to be displayed does fit into the size of the display area of the Web browser 300, it is envisioned that the possibility that a button tap will be used, for example, is high and so a threshold that makes detection of a click operation which is related to that operation easier is set.

[Application]

In the flowchart of FIG. 5, a determination of a click threshold is made in accordance with the size of the display content (height and width), but configuration may be taken to decide the click threshold by other determination criteria. Below, explanation about an application that uses other determination criteria is given.

[Threshold Setting Determination Processing Based on Event Handler]

For example, in a case where an event handler for a mouse movement is used in JavaScript (registered trademark), it can be expected that a drag operation will be used. Accordingly, whether or not an event handler is included in the Web content is made to be a determination criterion, and when included, the click threshold is changed to be suited to dragging.

JavaScript Description Example

Figures 8, 9:
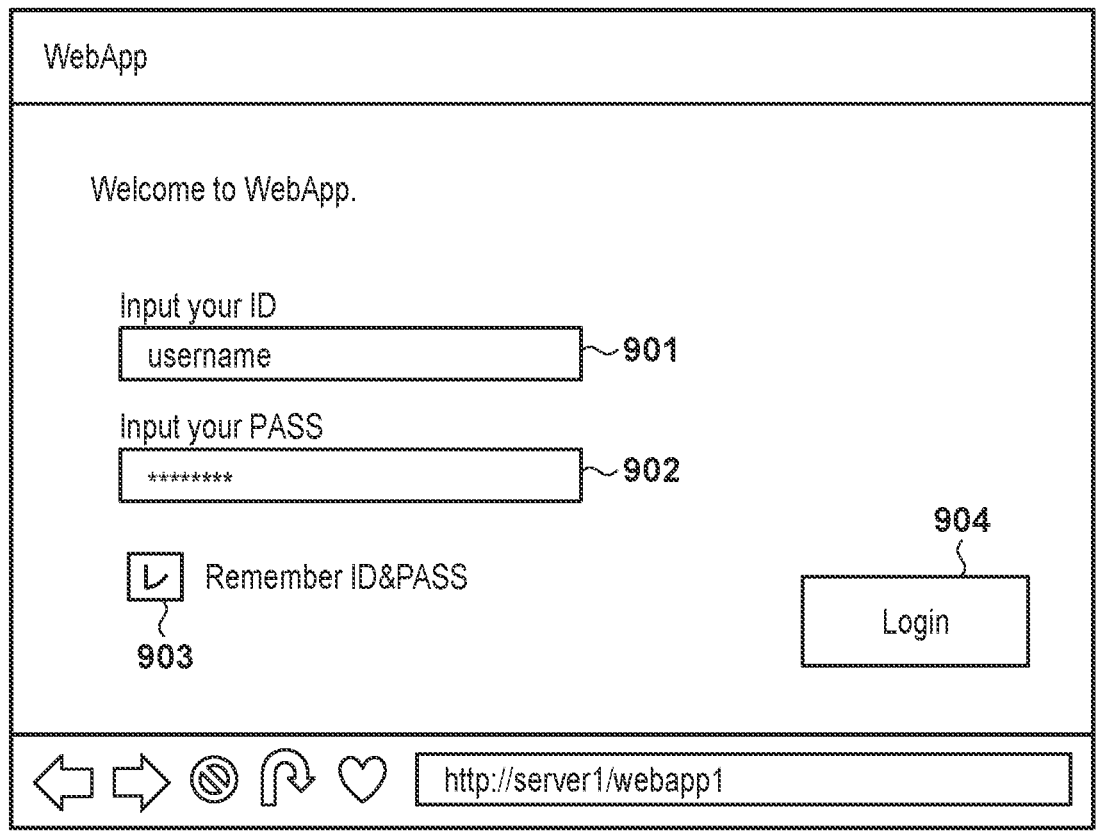
FIG. 8 is a view illustrating an example of a JavaScript description for detecting mouse movement according to the present invention.
FIG. 9 is a view illustrating a display example of Web content in which input forms are present according to the present invention.

FIG. 8 is a view illustrating an example of a description of JavaScript (registered trademark) code for detecting mouse and touch movement. In the present example, by using an onmousemove event handler 801, a movement amount of a mouse or touch operation is detected in JavaScript (registered trademark) (802). Note that the event handler used for determination is not limited to this, and another event handler may be targeted. For example, there is content that realizes drag and drop by using a draggable attribute defined in HTML5. In such Web content including a description for detecting movement in a touch state, in the present application, the processing unit 303 sets a click threshold suited to dragging. By this, it is possible to reduce operation misdetection and improve user operability when displaying Web content for which a drag operation is determined to be necessary.

(Operational Flow)

Figure 11:
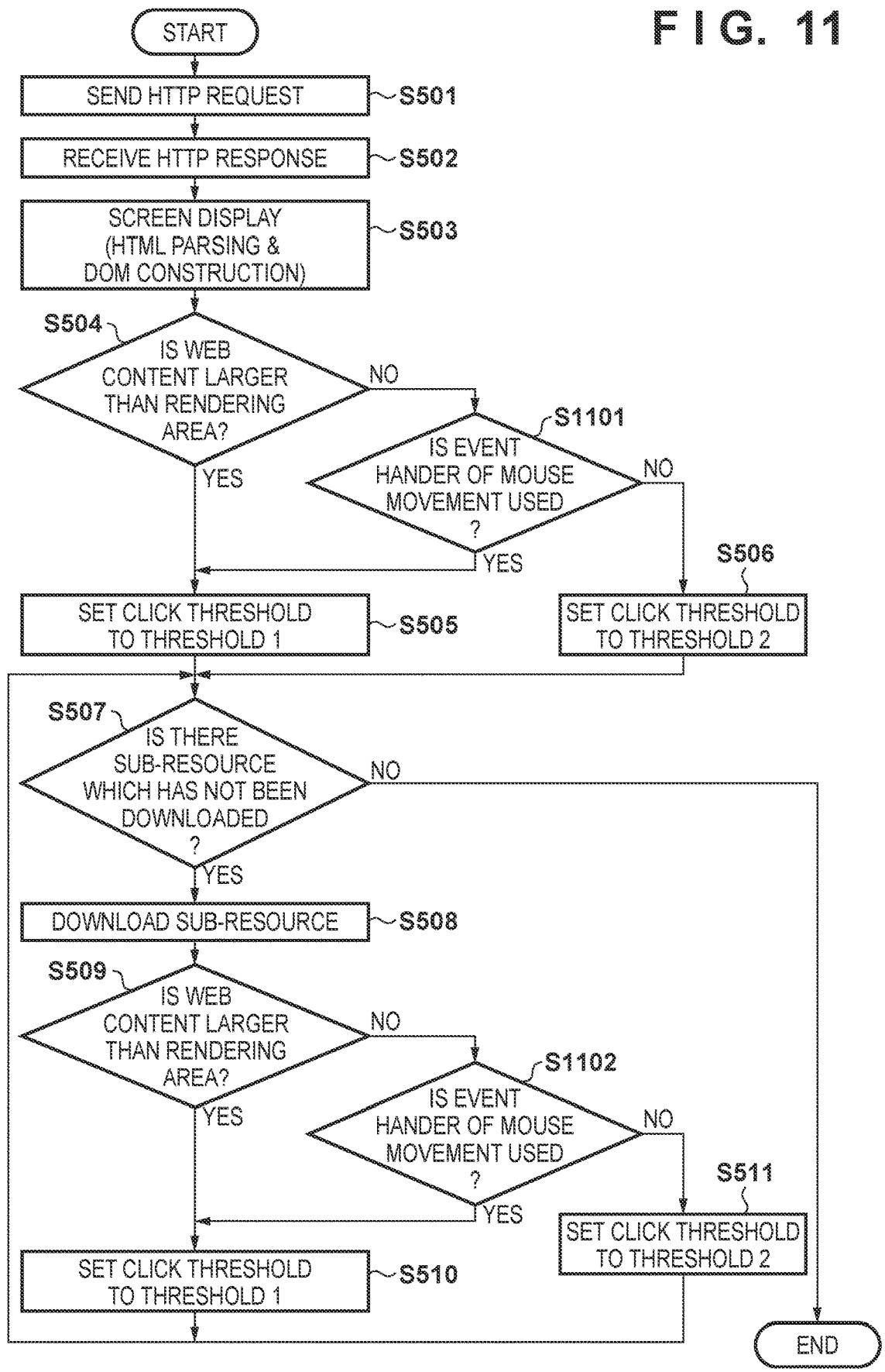
FIG. 11 is a flowchart for describing processing for determining a threshold setting by an existence or absence of an event handler.

FIG. 11 illustrates a flowchart for describing processing in the Web browser 300 for determining a threshold setting in accordance with the Web content size and the existence or absence of the onmousemove event handler. In the present application, in addition to determination processing illustrated in FIG. 5, processing for determining whether or not an event handler for mouse movement is being used in JavaScript (registered trademark) is added. In other words, step S1101 and step S1102 are added to a flow of FIG. 5. Below, explanation is given only of differences with FIG. 5 and explanation about common processing is omitted.

In step S504, the processing transitions to step S1101 in the case where the display width and the display height of the Web content are less than or equal to those of the display area of the Web browser 300 (NO in step S504), and transitions to step S505 in the case where they are larger than those of the display area (YES in step S504).

In step S1101, the processing unit 303 of the Web browser 300 determines whether or not a description of the onmousemove event handler 801 is present in the Web content. The processing transitions to step S505 in the case where it is present (YES in step S1101), and transitions to step S506 (NO in step S1101) in the case where it is not present. The determination here can be made by analyzing the JavaScript (registered trademark) program illustrated in FIG. 8, for example.

In step S509, the processing transitions to step S1102 in the case where the display width and the display height of the Web content are less than or equal to those of the display area of the Web browser 300 (NO in step S509), and transitions to step S510 in the case where they are larger than those of the display area (NO in step S509). The processing of step S1102 is the same as in step S1101.

[Threshold Setting Determination Processing Based on Number of Input Forms]

An explanation about another application will be given. In Web content, in the case where the number of input forms such as buttons and text areas is greater than or equal to a fixed number, it can be expected that many click operations will be performed. Accordingly, when Web content in which the number of input forms is greater than or equal to a fixed number is displayed, a click threshold that is suited to clicking is set.

(Display Example of Web Content)

FIG. 9 is a view illustrating a display example of Web content which includes input forms. The Web content includes a text area 901, a password input area 902, a check-box 903, and a button 904. When displaying Web content in which many input forms that require user click and touch operation are included, such as is illustrated in FIG. 9, a click threshold suited to clicking is set in the present application. By this, it is possible to reduce operation misdetection and improve user operability when displaying Web content for which a click operation is determined to be necessary.

(Operational Flow)

Figure 12:
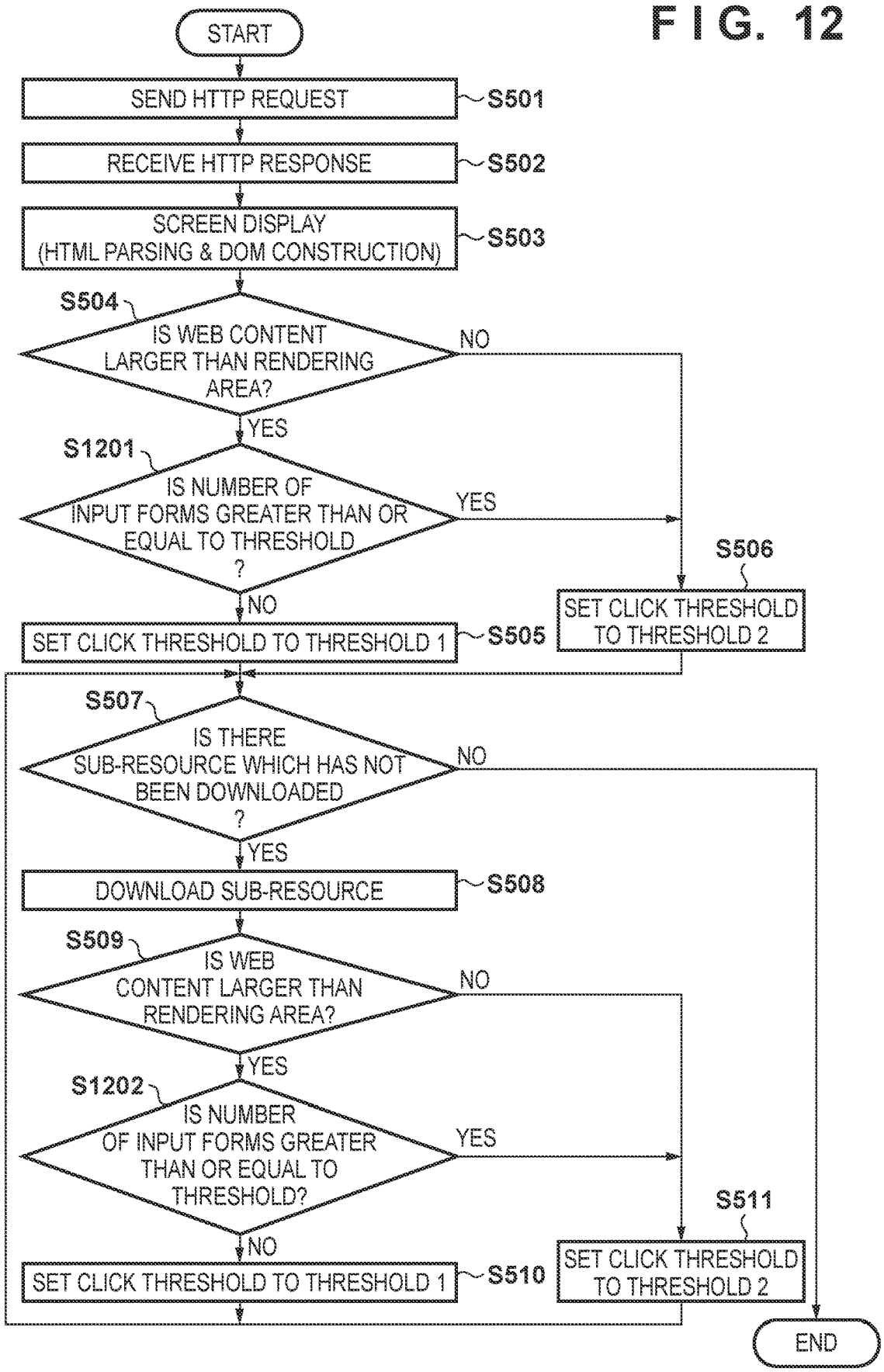
FIG. 12 is a flowchart for describing processing for determining a threshold setting according to a number of input forms.

FIG. 12 is a flowchart for describing processing in the Web browser 300 for determining a threshold setting according to the size of Web content and the number of input forms. In the present application, in addition to the determination processing illustrated in FIG. 5, a process for determining in accordance with the number of input forms included in the Web content is added. In other words, step S1201 and step S1202 are added to the flow of FIG. 5. Below, explanation is given only of differences with FIG. 5 and explanation about common processing is omitted.

In step S504, the processing transitions to step S1201 in the case where the display width and the display height of the Web content are larger than the display area of the Web browser 300 (YES in step S504), and transitions to step S506 in the case where they are less than or equal to those of the display area (NO in step S504).

The processing unit 303 of the Web browser 300, in step S1201, checks how many input forms are present in the Web content. Input form here means an element such as a text area, a password input area, a check-box, a button, or the like for which a user click operation is necessary, and in the case of the example of FIG. 9 there are four. In such a case, it is possible to confirm the number of input forms by counting corresponding HTML tags in the HTML data description of the Web content. For example, a text input form 1401 and a password input form 1402 which are input elements are included in the case of the HTML data description example illustrated in FIG. 14. The processing unit 303 checks the number of input forms by counting these input elements.

The processing unit 303 reads out the input form threshold 620 illustrated in FIG. 6C from the storage unit 304. The processing proceeds to step S506 in the case where the number of input forms is greater than or equal to the input form threshold (YES in step S1201), and the processing proceeds to step S505 in the case where the number of input forms is less than the input form threshold (NO in step S1201).

Also, in step S509, the processing transitions to step S511 in the case where the display width and the display height of the Web content are less than or equal to those of the display area of the Web browser 300 (NO in step S509), and transitions to step S1202 in the case where they are larger than those of the display area (YES in step S509). The processing of step S1202 is the same as in step S1201.

[Threshold Setting Determination Processing Based on Display Size of Content in Frame]

An explanation about another application will be given. In the case where content displayed within a frame (frame element or iframe element) defined in the HTML data of the Web content is larger than the size of the frame, it is necessary to scroll by a drag operation. Accordingly, in the present application, the click threshold is changed to be suited to dragging in accordance with the size of the content displayed in the frame.

(Display Example of Web Content)

Figure 10:
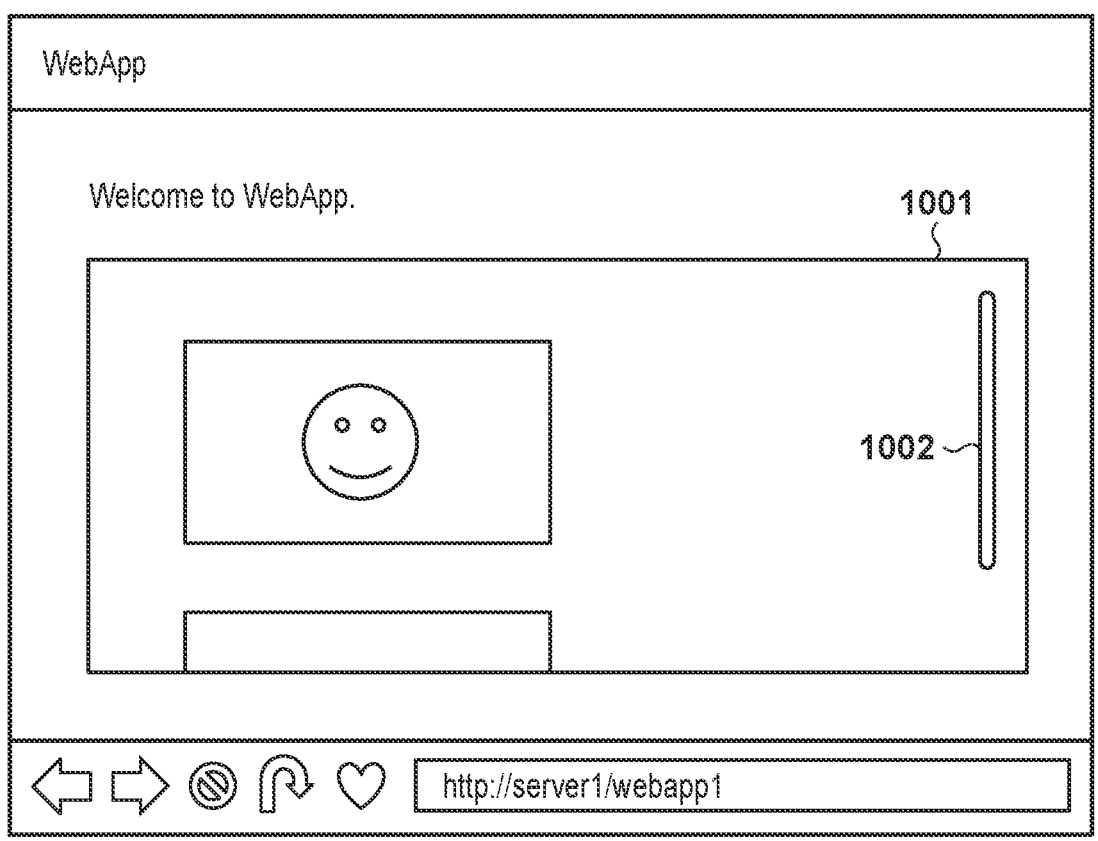
FIG. 10 is a view illustrating a display example of Web content including a frame element for which scrolling is necessary according to the present invention.

FIG. 10 is a view illustrating a display example of Web content which includes a frame that requires scrolling. The Web content includes a frame 1001. In the case where the content displayed in the frame 1001 is larger than the size of the frame 1001, a scroll bar 1002 is displayed, and the user must scroll in the frame 1001 by the drag operation in order to confirm the entirety of the content. In such Web content, in the present application, the processing unit 303 sets a click threshold that is suited to dragging. By this, it is possible to reduce operation misdetection and improve user operability when displaying Web content for which a drag operation is determined to be necessary.

(Operational Flow)

Figure 13:
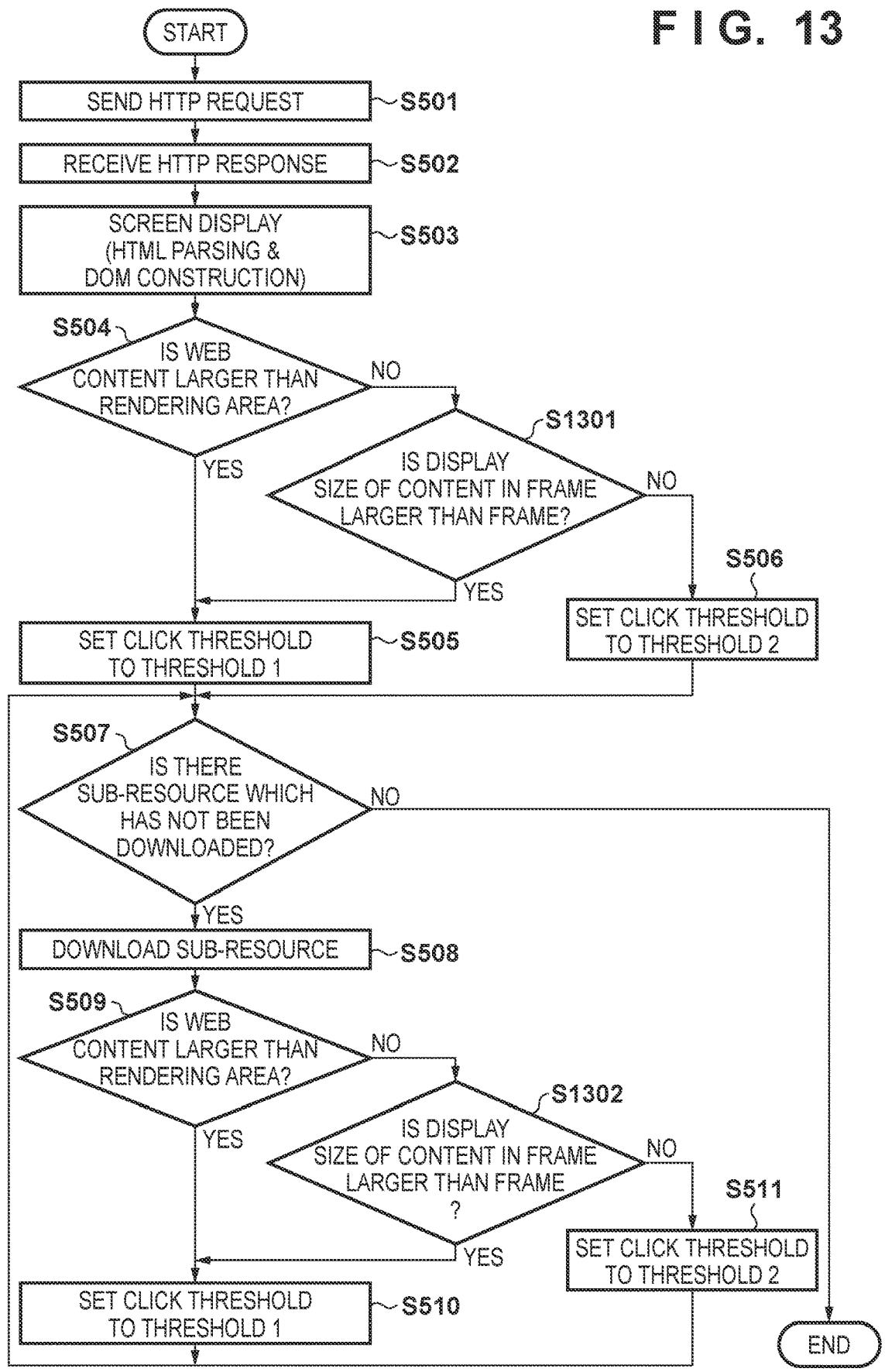
FIG. 13 is a flowchart for describing processing for determining a threshold setting according to a size of content in a frame.

FIG. 13 is a flowchart for describing processing in the Web browser 300 for determining a threshold setting according to the size of Web content and the display size of content in a frame. In the present application, in addition to the determination processing illustrated in FIG. 5, processing for determining whether or not content displayed within the frame is larger than the size of the frame is added. In other words, step S1301 and step S1302 are added to a flow of FIG. 5. Below, explanation is given only of differences with FIG. 5 and explanation about common processing is omitted.

In step S504, the processing transitions to step S1301 in the case where the display width and the display height of the Web content are less than or equal to those of the display area of the Web browser 300 (NO in step S504), and transitions to step S505 in the case where they are larger those of than the display area (YES in step S504).

In step S1301, the processing unit 303 of the Web browser 300 determines whether or not the size of the content displayed in a frame included in the Web content is larger than the size of the frame. The size of the content displayed in the frame and the size of the frame is obtained when the processing unit 303 displays the Web content on the UI display apparatus 205. The processing transitions to step S505 in the case where the size of the content displayed on the frame is larger than the size of the frame (YES in step S1301), and the processing transitions to step S506 in a case where it is less than or equal to the frame size (NO in step S1301).

In step S509, the processing transitions to step S1302 in the case where the display width and the display height of the Web content are less than or equal to those of the display area of the Web browser 300 (NO in step S509), and transitions to step S511 in the case where they are larger than those of the display area (YES in step S509). The processing of step S1302 is the same as in step S1301.

[Touch Operation Determination Processing]

FIG. 16 is a flowchart illustrating touch operation determination processing in the Web browser 300. This processing flow is realized by the CPU 201 of the MFP 101 reading a program according to the Web browser 300 and executing it.

In step S1601, the detecting unit 305 of the Web browser 300 detects the start of a touch inputted via the user input apparatus 204 by a user operation. In such a case, the detecting unit 305 temporarily stores that a touched position is a touch start position.

In step S1602, the detecting unit 305 detects that the state of the touch operation changed from the touch start detected in step S1601. In other words, a change of the touch position and a touch end (release of the contact on the screen) is detected. In such a case, the detecting unit 305 temporarily stores the touch position at the time that the change of state is detected as the touch position at the time of state change.

In step S1603, the determination unit 306 of the Web browser 300 determines whether or not the state change of the touch operation detected in step S1602 is a touch end. The processing transitions to step S1604 in the case of a touch end (YES in step S1603), and in the case that it is not a touch end (in other words, in the case of a touch position change) (NO in step S1603), the processing transitions to step S1607.

In step S1604, the determination unit 306 calculates the distance (movement amount) from the touch start position to the touch end position. Then, the determination unit 306 determines whether or not the calculated distance is less than or equal to the click threshold set in step S404 or in step S408. The processing transitions to step S1605 if it is less than or equal to the click threshold (YES in step S1604), and the processing transitions to step S1606 in the case where it is larger than the click threshold (NO in step S1604).

Note, in the case in which the click threshold is represented by sections as illustrated in FIG. 6B (in the case where one of the threshold of the section thresholds 610 is selected), YES is determined in step S1604 and the processing transitions to step S1605 in the case where the calculated distance fits into the section of the upper limit to the lower limit for a click. Also, NO is determined in step S1604 and the processing transitions to step S1606 in the case where the calculated distance fits into the section from the upper limit to the lower limit for dragging. Furthermore, this processing flow ends in the case where neither of these applies because this correspond to neither a click nor a drag.

In step S1605, the determination unit 306 determines that a sequence of touch operations by a user indicate a click (tap), and click processing (a press of button or a click of a link in Web content or the like) is performed. This processing flow is then ended.

In step S1606, the determination unit 306 determines that a sequence of touch operations by a user indicate a drag, and drag processing (scrolling of a Web content screen or the like) is performed. This processing flow is then ended.

In step S1607, the determination unit 306 calculates the distance from the touch start position to the touch position after the state change. Then, it determines whether or not the calculated distance is less than or equal to the click threshold. The processing transitions to step S1602 in the case where the distance is less than or equal to the click threshold (YES in step S1607), and the processing transitions to step S1608 in the case where it is larger than the click threshold (NO in step S1607).

Note, as is illustrated in FIG. 6B, in the case where the calculated distance fits into the section of the upper limit to the lower limit for clicking in the case where the click threshold is represented by sections, YES is determined in step S1607, and the processing transitions to step S1602. Also, NO is determined in step S1607 and the processing transitions to step S1608 in the case where the calculated distance fits into the section from the upper limit to the lower limit for dragging. Furthermore, the processing transitions to 1602 in the case where neither of these apply.

In step S1608, the determination unit 306 determines that a sequence of touch operations by a user indicate a drag, and drag processing (scrolling of a Web content screen or the like) is performed. After this, the processing transitions to step S1602.

As described above, in the present application invention, the Web browser on the MFP decides the threshold for determining a click (tap) in accordance with the content of the Web content at the time of content download. By this, it becomes possible to set a threshold that is suited to the content displayed on the Web browser, and thereby improve user operability.

Note that in the above, an example is illustrated in which the timing of deciding the click threshold is at the time of DOM construction for JavaScript (registered trademark), or at the time of a sub-resource download. However, limitation is not made to this, and the deciding may be performed at a timing at which, for example, a change in display result or DOM configuration occurs.

Also, the processing described above is only one example, and the determination criteria for changing the click threshold is not limited to the applications described above. The determination criteria may be decided by referencing the content of the Web content and the result of displaying the Web content. Also, configuration may be taken so as combine the applications (determination criteria) described above as necessary rather than implement them independently. Also, in the foregoing description, the determination is performed depending on the movement distance for the click operation (tap operation) and the drag operation (two types). However, another index such as time, for example, may also be considered. Furthermore, configuration may be taken to determine other types of touch input such as flicks and swipes. In such a case, configuration may be taken so as set more thresholds.

Also, the processing related to determination of a click threshold change may be described in JavaScript (registered trademark), and in such a case, it is possible to configure so that a JavaScript (registered trademark) description is included in Web content.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-179983, filed Sep. 14, 2016, which is hereby incorporated by reference herein in its entirety.

What is claimed is:
1. An information processing apparatus, comprising:
a display;
a touch input interface;
at least one memory storing instructions; and
at least one processor that, upon executing the instructions, performs the functions of:
an obtaining unit configured to obtain content;
a first determination unit configured to determine whether a display size of the obtained content is larger than a size of a display area in the display;
a setting unit configured to set, based on the determination result by the first determination unit, a threshold for determining whether an operation of a touch input to the touch input interface is a drag operation, wherein the threshold to be set when it is determined that the display size of the obtained content is larger than the size of the display area in the display is different from the threshold to be set when it is determined that the display size of the obtained content is smaller than the size of the display area in the display; and a second determination unit configured to at least determine, using the set threshold, whether the operation of the touch input to the touch input interface is a drag operation, wherein the second determination unit determines that the operation of the touch input is a drag operation when a movement distance of the touch input to the touch input interface is larger than the set threshold, and determines that the operation of the touch input is not a drag operation when the movement distance of the touch input to the touch input interface is smaller than the set threshold;

wherein the setting unit sets a first threshold as the threshold for determining whether the operation of the touch input to the touch input interface is a drag operation when it is determined that the display size of the obtained content is larger than the size of the display area in the display, and sets a second threshold as the threshold for determining whether the operation of the touch input to the touch input interface is a drag operation when it is determined that the display size of the obtained content is smaller than the size of the display area in the display, the second threshold being larger than the first threshold; and wherein the content is controlled to be displayed with scrolling when it is determined as a result of the determination by the second determination unit that the operation of the touch input to the touch input interface is a drag operation.

2. The information processing apparatus according to claim 1, wherein the setting unit further sets, based on the determination result by the first determination unit, a threshold for determining whether the operation of the touch input to the touch input interface is a click operation, and wherein the second determination unit further determines, using the set threshold for determining whether the operation of the touch input is a click operation, whether the operation of the touch input to the touch input interface is a click operation.

3. The information processing apparatus according to claim 2, wherein the threshold for determining whether the operation of the touch input to the touch input interface is a drag operation is larger than the threshold for determining whether the operation of the touch input to the touch input interface is a click operation.

4. The information processing apparatus according to claim 1, wherein the content is a Web content, and the display area of the content is a display area of a Web browser.

5. The information processing apparatus according to claim 4, wherein the at least one processor further performs the functions of a changing unit configured to change the size of the display area of the Web browser based on a user instruction, and wherein if the changing unit changes the size of the display area of the Web browser, the setting unit sets the threshold based on the display size of the obtained content and the size of the display area in the display.

6. A non-transitory computer-readable storage medium storing a program for causing a computer, which can communicate with a display and a touch input interface, to function as:

an obtaining unit configured to obtain content;

a first determination unit configured to determine whether a display size of the obtained content is larger than a size of a display area in the display;

a setting unit configured to set, based on the determination result by the first determination unit, a threshold for determining whether an operation of a touch input to the touch input interface is a drag operation, wherein the threshold to be set when it is determined that the display size of the obtained content is larger than the size of the display area in the display is different from the threshold to be set when it is determined that the display size of the obtained content is smaller than the size of the display area in the display; and a second determination unit configured to at least determine, using the set threshold, whether the operation of the touch input to the touch input interface is a drag operation, wherein the second determination unit determines that the operation of the touch input is a drag operation when a movement distance of the touch input to the touch input interface is larger than the set threshold, and determines that the operation of the touch input is not a drag operation when the movement distance of the touch input to the touch input interface is smaller than the set threshold;

wherein the setting unit sets a first threshold as the threshold for determining whether the operation of the touch input to the touch input interface is a drag operation when it is determined that the display size of the obtained content is larger than the size of the display area in the display, and sets a second threshold as the threshold for determining whether the operation of the touch input to the touch input interface is a drag operation when it is determined that the display size of the obtained content is smaller than the size of the display area in the display, the second threshold being larger than the first threshold; and wherein the content is controlled to be displayed with scrolling when it is determined as a result of the determination by the second determination unit that the operation of the touch input to the touch input interface is a drag operation.

7. The medium according to claim 6, wherein the setting unit further sets, based on the determination result by the first determination unit, a threshold for determining whether the operation of the touch input to the touch input interface is a click operation, and wherein the second determination unit further determines, using the set threshold for determining whether the operation of the touch input is a click operation, whether the operation of the touch input to the touch input interface is a click operation.

8. The medium according to claim 7, wherein the threshold for determining whether the operation of the touch input to the touch input interface is a drag operation is larger than the threshold for determining whether the operation of the touch input to the touch input interface is a click operation.

9. The medium according to claim 6, wherein the content is a Web content, and the display area of the content is a display area of a Web browser.

10. The medium according to claim 9, wherein the program further causes the computer to function as a changing unit configured to change the size of the display area of the Web browser based on a user instruction, and wherein if the changing unit changes the size of the display area of the Web browser, the setting unit sets the threshold based on the display size of the obtained content and the size of the display area in the display.

* * * * *